United States Patent
Karayel et al.

(10) Patent No.: US 9,087,119 B2
(45) Date of Patent: Jul. 21, 2015

(54) METHOD FOR SEARCHING IN A PLURALITY OF DATA SETS AND SEARCH ENGINE

(75) Inventors: Emin Karayel, Pforzheim (DE); Carsten Heinz, Pforzheim (DE); Matthias Krings, Karlsruhe (DE)

(73) Assignee: Omikron Data Quality GmbH, Pforzheim (DE)

( * ) Notice: Subject to any disclaimer, the term of this patent is extended or adjusted under 35 U.S.C. 154(b) by 179 days.

(21) Appl. No.: 13/818,180

(22) PCT Filed: Aug. 17, 2011

(86) PCT No.: PCT/EP2011/064163
§ 371 (c)(1),
(2), (4) Date: Feb. 21, 2013

(87) PCT Pub. No.: WO2012/025439
PCT Pub. Date: Mar. 1, 2012

(65) Prior Publication Data
US 2013/0151499 A1   Jun. 13, 2013

(30) Foreign Application Priority Data
Aug. 25, 2010   (EP) .................................... 10174043

(51) Int. Cl.
*G06F 17/30* (2006.01)

(52) U.S. Cl.
CPC .................................. *G06F 17/3064* (2013.01)

(58) Field of Classification Search
None
See application file for complete search history.

(56) References Cited

U.S. PATENT DOCUMENTS

| | | | |
|---|---|---|---|
| 2006/0253427 A1 | 11/2006 | Wu et al. | 707/3 |
| 2008/0077570 A1 | 3/2008 | Tang et al. | 707/5 |
| 2008/0082511 A1 | 4/2008 | Williams | 707/3 |
| 2008/0114721 A1 | 5/2008 | Jones et al. | 707/2 |

FOREIGN PATENT DOCUMENTS

| | | | |
|---|---|---|---|
| EP | 0 752 676 | 1/1997 | G06F 17/30 |
| EP | 1 072 982 | 1/2001 | G06F 17/30 |

OTHER PUBLICATIONS

Tuan-Quang Nguyen et al, Query Expansion Using Augmented Terms in an Extended Boolean Model, vol. 2 No. 1, Mar. 2008 pp. 26-43.*

(Continued)

*Primary Examiner* — Belix M Ortiz Ditren
(74) *Attorney, Agent, or Firm* — Kusner & Jaffe (57) ABSTRACT

The invention relates to a method implemented by a computer for searching in a plurality of data sets. In the method a search query is received and a partial quantity having terms similar to or identical to the search term is derived from a reference quantity. A similarity measure to the search term and the probability of the occurrence of the term is then determined for each term. Furthermore, a weighted distribution depending on the term is applied to the terms, and a modified probability is determined for the term. The data sets are further evaluated with respect to the relevance thereof to the search query, and at least one partial data set quantity is output as a function of the relevance value thereof. The invention further relates to a search engine for performing said method.

13 Claims, 2 Drawing Sheets

(56) References Cited

OTHER PUBLICATIONS

Translation of the International Preliminary Report on Patentability for International Application No. PCT/EP2011/064163, Feb. 26, 2013.
International Search Report for International Application No. PCT/EP2011/064163, Nov. 15, 2011.
Nguyen et al., "Query expansion using augmented terms in an extended Boolean model," Journal of Computing Science and Engineering Korean Institute of Information Scientists and Engineers Sound Korea, vol. 2, No. 1, Mar. 1008 (Mar. 2008), pp. 26-43, XP002603537, ISSN: 1976-4677.
Kwon et al., "Query expansion using domain-adapted, weighted thesaurus in an extended Boolean model," CIKM 94, Proceedings of the Third International Conference on Information and Knowledge Management ACM, New York, NY, USA, 1994, pp. 140-146, XP002603538, ISBN: 0-89791-674-3.

* cited by examiner

METHOD FOR SEARCHING IN A PLURALITY OF DATA SETS AND SEARCH ENGINE

FIELD OF THE INVENTION

The present invention relates to a computer-implemented method for searching a multiplicity of data records. In addition, the invention relates to an appropriate search engine which can be executed by a computer.

BACKGROUND OF THE INVENTION

Searching a multiplicity of data records is of great importance, for example in what are known as online shops. A provider of a multiplicity of products records the products provided in a database using data records. A user can then use his computer to set up a connection to the online shop via a network, such as the Internet, and to recall the data records from the database. If the database comprises a very large stock of data, and if the individual data records have a relatively complex structure, then it is necessary for the user to be able to search the data records using a search engine. In this case, the user transmits a search query to the online shop. The online shop or a system connected thereto processes the search query and returns data records ordered in a particular manner to the user as hits. In this context, the problem arises of determining the data records which are particularly relevant to the search query from the user.

Furthermore, it is known practice not only to search the database of an online shop but also to search for data which can be received via the Internet. Search engines of this kind are called Internet search engines.

For all search engines, the problem arises that the search query is frequently vague and subject to uncertainty. The search terms in the search query frequently do not correspond exactly to the terms which occur in the data records that are to be searched. Furthermore, the search terms may contain typing errors or may also be intended to refer to grammatically different forms of the search term. When processing the search query, pains are therefore always taken to factor in the vagueness and uncertainty of the search query.

EP 1 095 326 B1 describes a search system for retrieving information which is stored in the form of text. For retrieving the information, the search system involves the use of a tree structure as a data structure for the text. In addition, a measure is used to determine the degree of match between a query and the retrieved information, wherein the measure determines a combination of one measure of spacing for an approximate degree of match between words or symbols in the text and the query, and of another measure of spacing for an approximate degree of match between sequences of words or symbols in the text and a query sequence.

EP 1 208 465 B1 describes a search engine for searching a collection of documents. In the case of this search engine, data processing units form groups of nodes which are connected in a network. The search engine is customized such that it can be scaled in respect of the data volume and the query rate for search queries.

EP 1 341 009 B1 describes a method for operating an Internet search engine. The method involves links between websites on the Internet being processed by means of an intelligent agent. The contents of the visited websites are filtered in order to determine the relevance of the content. The relevant websites ascertained in this case are indexed, and the indexed, subject-specific information is stored in a database. The filters allow the contents of a website to pass through a subject-specific filter on a dictionary basis, said filter comparing contents of the website with terminology found in the dictionary.

EP 1 459 206 B1 describes a computer-implemented method for searching for a collection of items, each item in the collection having a set of properties. The method involves the receipt of a query which is formed from a first set of two or more properties. A distance function is then applied to one or more of the items in the collection, and a result item or a plurality of result items are identified on the basis of the distance function. In this case, the distance function determines a distance between the query and an item in the collection, specifically on the basis of the number of items in the collection which have all the properties within the intersection between the first set of properties and the set of properties for the item.

Finally, EP 1 622 054 A1, WO 2008/085637 A2 and WO 2008/137395 A1 describe further search methods and search engines for searching data records.

Finally, the publication by Tuan-Quang Nguyen et al.: "Query expansion using augmented terms in an extended Boolean model", Journal of Computing Science and Engineering Korean Institute of Information Scientists and Engineers South Korea, vol. 2, No 1, March 2008 (2008-03), pages 26-43, ISSN: 1976-4677, discloses a search method which involves the original search query first of all being expanded by terms which are selected from a thesaurus, for example. The selection of these added terms factors in the similarity to the original search term. Finally, yet further terms (augmented terms) are added which factor in the joint occurrence of the search terms in the documents. The terms in the search query that has been expanded in this manner are then provided with weightings, the original search term being provided with the weighting 1 and the added terms being provided with a weighting which is dependent on the similarity to the original search term. Disadvantageously, however, the method in this document does not solve the problem, inter alia, that incorrectly spelled words in a search query result in a very high level of relevance for the incorrectly spelled word, since incorrectly spelled words do not occur in documents at all or occur rarely.

SUMMARY OF THE INVENTION

The present invention is based on the technical problem of providing a computer-implemented method for searching a multiplicity of data records and an appropriate search engine which can be executed by a computer and which takes the multiplicity of data records and outputs particular data records which are as relevant as possible to a received search query.

The invention solves this technical problem by means of a method and a search engine disclosed herein.

The method according to the invention involves a search query containing at least one search term being received. Next, a subset containing terms which are similar or identical to the search term is ascertained from a reference set. If the search query contains a plurality of search terms, a reference set is ascertained separately for each search term. For each term in the subset, a measure of similarity to the search term is then determined and the probability of the occurrence of the term is determined. A weighting distribution which is dependent on the term is then applied to the terms in the subset, wherein the terms which have a higher measure of similarity are weighted more strongly than terms having a lower measure of similarity. After that, a modified probability for the term is determined from the weighted probabilities of the terms in the subset.

Next, the method according to the invention involves the data records being rated for their relevance to the search query. This rating involves a check to determine whether the terms in the subset occur in the data record, and if a term in the subset does occur in the data record then a lower modified probability for the term results in a higher relevance rating for the data record. Finally, at least one data record subset is output on the basis of its relevance rating.

For the relevance of a search term in a search query, it is important how frequently this search term occurs in sets containing such terms. If a term usually occurs very frequently, it is less relevant for processing the search query than a search term in the search query which usually occurs very rarely in sets of terms. The method according to the invention factors in the different frequencies with which search terms occur by determining a probability of occurrence for each term in the subset. By way of example, these term probabilities can be determined in advance using particular sets containing terms, for example using texts selected in advance in which the word frequencies have been determined. The set to which the probability of occurrence of the terms relates may furthermore be formed by all of the terms which occur in the data records to be searched. These data records can be searched and indexed in advance. In this case, for each term in a data record, it is furthermore possible to determine the frequency with which this term has occurred in the data records.

In this case, however, the problem may arise that firstly the data records to be searched may contain errors and secondly the search terms in a search query may also contain errors. By way of example, the errors may be misspellings or typing errors. A word may be contained in an incorrect spelling in a data record, for example. If the frequency of occurrence of the terms is now determined, an incorrectly spelled word in a search term would result in this word having a particularly high level of relevance to the search query, since it occurs very rarely. The same situation arises when the probability of the occurrence of a term is determined from all of the terms which occur in the data records. If the data records contain an incorrectly spelled word, this word occurs very rarely, which means that the probability of occurrence of this word is very low and hence the relevance of the word to a search query is very high.

The method according to the invention solves this problem by not only factoring in the probability of occurrence or the frequency of a term in a search query but also, for each search term in the search query, ascertaining a subset containing terms from a reference set which is factored in during the subsequent relevance rating of the data records in respect of this search term. By way of example, the subset can be determined using a dictionary. In this case, the result is that a search term containing an incorrectly spelled word would not be contained in the subset, but rather the subset would contain only similar words which are spelled correctly.

So as also to factor in other grammatical forms of a word in a search term, the reference set contains particularly all grammatical forms of words. The subset will therefore contain not only a word in a search term but also other grammatical forms of this word, since these forms are similar to the search term.

The method according to the invention then does not factor in only each term in this thus determined subset during the relevance rating of the data records for the search term, but rather the invention factors in the terms in this subset in a particular manner:

Since each term in the subset has a measure of similarity to the associated search term determined for it, the terms in the subset can be ordered on the basis of their measure of similarity. A weighting distribution is then used to determine, on the basis of the term, how the other terms in the subset are factored in when determining the modified probability. In this case, terms which have a higher measure of similarity are weighted more strongly than terms having a lower measure of similarity. In this way, it is possible, even in the case of a search term which contains a typing error, for example, to arrive at an appropriate modified probability for this term which is finally taken as a basis for determining the relevance of the data records. The reason is that the subset associated with a search term containing a typing error has a high probability of also containing the correctly spelled term and variations thereof. These terms which the subset contains are then also factored in when determining the modified probability, which means that the rare occurrence of the search term containing the typing error does not result in this term having a very high level of relevance for the rating of the data records. In the same way, it is also possible to prevent typing errors which occur in the data records that are to be searched from leading to unsuitable results for the rating of such a data record.

According to one refinement of the method according to the invention, the weighting distribution is in a form such that the determination of the modified probability of a term factors in only the probability of the term itself and also the probabilities of other terms which have a higher measure of similarity than the one term. In this case, the weighting distribution may therefore be a step function, for example, which outputs the weighting 1 for the term in the subset itself and also for other terms which have a higher measure of similarity than this term, and outputs the weighting 0 for terms in the subset having a lower measure of similarity, as a result of which these terms having a lower measure of similarity are ignored when determining the modified probability. When determining the modified probability for a term, the probability of the term itself is therefore firstly factored in and also the probability of every other term in the subset which has a higher measure of probability than this term.

According to one preferred refinement of the method according to the invention, the weighting with which the probability of a second term $t_k$ goes into the modified probability of a first term $t_j$ is determined by the evaluation of a sigmoid function, the evaluation center being the subtraction of the measure of similarity of the first term $t_j$ from the measure of similarity of the second term $t_k$. Since the sigmoid function, in contrast to a discontinuous step function, has a continuous transition from the value 0 to the value 1, this refinement of the method according to the invention can also factor in terms in the subset which have a slightly lower measure of similarity than the term for which the modified probability is determined. This allows a further improvement in the relevance of the data records that is rated on the basis of the modified probability.

According to a further refinement of the method according to the invention, the weighting distribution is in a form such that the determination of the modified probability of a term also factors in probabilities of other terms with a lower weighting which have a lower measure of similarity, the weighting of another term with a lower measure of similarity being dependent on the difference between the measure of similarity of the term for which the modified probability is determined and the measure of similarity of the other term. In particular, the weighting of another term with a lower measure of similarity will be higher the smaller the absolute value of the difference from the measure of similarity of the term for which the modified probability is determined. This means that by applying any other functions it is possible to factor in terms having a lower measure of similarity in order to determine the modified probability of each term in the subset and hence in order to rate the relevance of the data records.

The modified term probability of a given term is the probability of the combination of all terms for which the similarity (in the generalized sense) to the search term is greater than the similarity of the given term. For rating a data record, however, it makes sense to ascertain the probability of a data record containing such a term. Since a data record contains many terms, this probability is greater. In this regard, according to one development of the method according to the invention, the calculation of the modified probability furthermore involves the introduction of an intermediate step which factors in the distribution of the number of terms per data record for the data records that are to be searched. In particular, this takes account of the fact that a data record could simultaneously contain a plurality of similar terms.

By way of example, the rating of a data record may be obtained from the absolute value of the logarithm of the modified probability of the associated term. This makes it easier to combine the various probabilities of the terms that are to be factored in for determining the modified probability of a term.

The probability of the occurrence of the term in the subset is determined, in particular, by virtue of the probability associated with the term being ascertained in advance from the frequency of the term in the reference set or in the data records and being stored in a memory, and the stored probability for the term later being read from the memory. This advance determination of the probabilities allows the execution of the method to be speeded up and simplified. Furthermore, the choice of the reference set makes it possible to resort to general analyses regarding the frequency of occurrence of terms in sets, i.e. of words in texts, for example. Finally, by factoring in the frequency of occurrence of the terms in the data records, it is possible to ascertain probabilities which are customized to the specific data records. If the data records are a product database, for example, then the frequencies of occurrence of particular words can differ from the frequencies which have been determined from general texts of another type.

According to one development of the method according to the invention, the search query contains a plurality of search terms. In this case, a partial rating is determined separately for each search term. In addition, a further partial rating is determined for the search query compiled from the search terms. The rating of the search query is then determined from the partial ratings.

Furthermore, during the method, the relevance rating of the data records can involve a data record being rated more highly when a term in the subset occurs more frequently in this data record. By way of example, a data record can be rated more highly the more frequently a term in the subset occurs in this data record. In this way, it is possible for not only the probability of occurrence of a term and of further terms in the subset to be used for rating the relevance of the data records, but also the specific frequency of occurrence of a term in the data record that is to be rated. This measure also results in a further improvement in the rating of relevance of the data records.

By way of example, a data record may contain a plurality of fields each time. By way of example, this is the case particularly when the data records relate to a product database. In this case, particular fields are more important and other fields, by contrast, are less important for rating the relevance of the data records. For this reason, in this case the method according to the invention preferably involves the relevance of a data record furthermore being rated on the basis of the field in which a term in the subset occurs in the data record. If a term occurs in a particularly important field, this results in the data record being rated more highly than if the term occurs in a less important field.

In addition, the invention relates to a computer program product having program codes for carrying out the method described above when the program code is executed by a computer. In particular, the computer program product may be any storage medium for computer software.

The inventive search engine, which can be executed by a computer, comprises a reception unit for receiving a search query containing at least one search term. By way of example, the search query can be received via a network, such as the Internet. Furthermore, the search engine comprises means for ascertaining a subset containing terms which are similar or identical to the search term. This subset is ascertained from a reference set, in particular.

Furthermore, the search engine according to the invention comprises means for determining a modified probability for each term in the subset. These means for determining the modified probability are in a form such that a measure of similarity of the respective term for the search term can be determined, the probability of the occurrence of the term can be determined, a weighting distribution which is dependent on the term can be applied to the terms in the subset, wherein the terms which have a higher measure of similarity to the search term are weighted more strongly than terms having a lower measure of similarity, and the modified probability for the term can be determined from the weighted probabilities of the terms in the subset.

Furthermore, the search engine according to the invention comprises a rating unit for rating data records for their relevance to the search query. In particular, this rating unit can be used to check whether the terms in the subset occur in the data record and, if a term in the subset does occur in the data record then a lower modified probability of the term results in the data record being rated more highly.

Finally, the search engine according to the invention comprises an output unit for outputting a data record subset on the basis of its relevance rating.

In particular, the search engine according to the invention is in a form such that it can execute the method described above. It therefore also has the same advantages as the method indicated above.

According to one refinement of the search engine according to the invention, it comprises a memory which stores the reference set containing terms or a set containing the terms which occur in the data records, and also the probabilities associated with the terms. In this case, the probabilities are obtained particularly from the frequency of occurrence of the terms in the reference set or in the data records that are to be searched.

BRIEF DESCRIPTION OF THE DRAWINGS

The invention will now be explained using the exemplary embodiments with reference to the drawings.

DETAILED DESCRIPTION OF THE INVENTION

The exemplary embodiment described below relates to the searching of a product database D. For each product, this product database D stores a data record $d_1$. Each data record $d_1$ may in turn be divided into a plurality of fields which may relate to the price of the product, the color of the product, the material of the product or other relevant features of the product, for example.

The product database D is provided for a user in conjunction with an online shop. As shown schematically in FIG. 1, the user can use his computer 3 to access, via the Internet 2, a website which is provided by a central unit 1 of the online shop. The user can use his computer 3 to transmit to the online shop, via the Internet 2, a search query Q which is received by a reception unit 4 in the central unit 1 of the. The reception unit 4 transmits the search query Q to a device 5 for the purpose of ascertaining a subset V containing terms which are similar or identical to a search term $q_i$ in the search query Q. For this purpose, the central unit 1 is coupled to a memory 11. This memory 11 may firstly contain the product database D. Secondly, the memory 11 contains a reference set T containing terms t. By way of example, the reference set T is a word database which essentially contains all the words in a language or in a plurality of languages, or contains all the words which may arise in a product database. The terms t are in this case therefore words, in particular.

Figure 1:
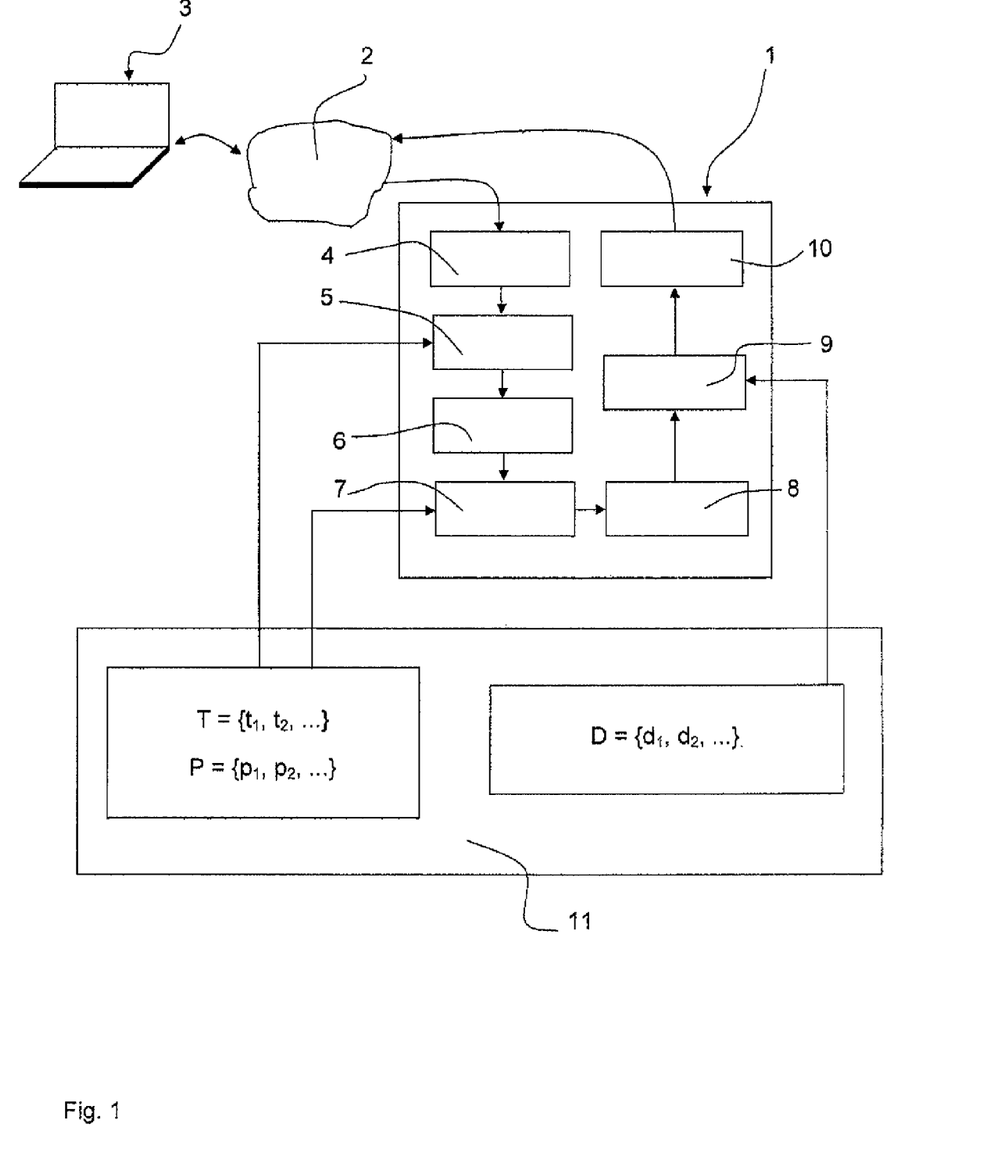
FIG. 1 schematically shows the basic design of the search engine according to an exemplary embodiment of the invention.

In addition, the memory 11 stores a probability $p_j$ for each term $t_j$. This probability $p_j$ for a term $t_j$ indicates what the probability is of this term $t_j$ occurring in a set containing terms. In particular, these probabilities $p_j$ can be derived from the frequencies with which a particular word occurs in texts in a particular language. These frequencies of occurrence are known per se and can be stored in the memory 11 in advance. Alternatively, in would be possible to determine how frequently a particular term $t_j$ occurs in the database D. From this frequency of occurrence, it would then be possible to determine the probability $p_j$ of the term $t_j$ occurring in the database D.

When the device 5 has determined a subset V containing terms $t_j$, the device 6 is used to determine, for each term $t_j$ in the subset V, a measure of similarity for the respective term $t_j$. The measure of similarity indicates how similar the term $t_j$ is to a search term $q_i$ in the search query Q.

The device 6 is coupled to a device 7 which is able to determine the probability $p_j$ of the occurrence of the term $t_j$. By way of example, the device 7 can easily read this probability $p_j$ from the memory 11, which stores these probabilities as ascertained in advance, as explained above.

The device 7 is coupled to a device 8 in which a weighting distribution $X_j$ which is dependent on a term $t_j$ in the subset V can be applied to all the terms $t_k$ in the subset V. By applying the weighting distribution $X_j$, weighted probabilities for the terms $t_k$ in the subset V are obtained. From these weighted probabilities, the device 8 can determine modified term probabilities $p''_j$. Furthermore, the device can factor in the number of terms per data record (for example by accessing the memory 11). This results in the modified probability $p'_j$ of a term $t_j$ or an even more similar term occurring in a data record.

The modified probabilities $p'_j$ are transmitted by the device 8 to a rating unit 9. The rating unit 9 rates the data records $d_1$ for their relevance to the search query Q. For this purpose, the rating unit 9 accesses the memory 11 and, for each data record $d_1$ in the product database D, checks whether the terms $t_j$ in the subset V occur in the data record $d_1$. If a term $t_j$ in the subset V does occur in the data record $d_1$, the rating unit 9 rates the data record $d_1$ by factoring in the modified probabilities $p'_j$ of the terms $t_j$ that occur, The rating unit 9 transmits the relevance rating to an output unit 10. The output unit 10 determines a data record subset on the basis of its relevance rating. By way of example, the output unit can output a particular number of data records $d_1$ which have been provided with the highest relevance ratings in the order of their relevance rating. This output can be made available to the computer 3 of the user via the Internet 2, for example by means of a display on a website which is displayed on the computer 3 of the user.

Details concerning the devices of the central unit 1 that are described above are described below in connection with the explanation of an exemplary embodiment of the method according to the invention:

It is subsequently assumed that the product database D contains data records $d_1$ for articles of clothing. By way of example, the product database D is able to contain 300 data records. The product database D therefore comprises the data records $d_1, d_2, \ldots, d_{300}$.

In addition, it is subsequently assumed that 15 data records in the product database D contain the word "Shirt" and 60 data records in the product database contain the word "blaues". Therefore, 5% of the data records contain the word "Shirt" and 20% of the data records contain the word "blaues". Furthermore, to simplify matters, it is initially assumed that these words occur no more than once in each data record $d_1$.

In such a case, it is known practice for search engines to consider inverse document frequency. This involves data records $d_1$ which contain a rarer word being assigned a higher relevance than the data records $d_1$ which contain a more frequently occurring word. In the example above, the data records which contain the word "Shirt" are therefore assigned a higher relevance that the data records $d_1$ which contain the word "blaues". Furthermore, it is ascertained which data records $d_1$ contain the two words "blaues" and "Shirt". Assuming that these two words do not correlate, it can be expected that it is precisely three data records. This is calculated from the product of the two probabilities of the words occurring in the data records $d_1$, i.e. the probability $p_{shirt}=0.05$, multiplied by the probability $p_{blaues}=0.2$. The probability of these two words being contained in a data record $d_1$ is therefore 0.01 (1%).

The relevance of a data record $d_1$ to a search query Q is high precisely when the product of the probabilities of the words which occur in this data record $d_1$ and to which the search query are relevant is small. The more specific a data record d, the higher its relevance. In order to be able to link the individual probabilities more easily, it is therefore preferred to form the absolute value of the logarithm of the probability. This absolute value increases with relevance and behaves additively toward the individual probabilities. In the previous example, the logarithmic probability of a data record $d_1$ containing the word "blaues" is 0.7, of a data record $d_1$ containing the word "Shirt" is 1.3, and the logarithmic probability of a data record $d_1$ containing both words is 2.

Figure 2:
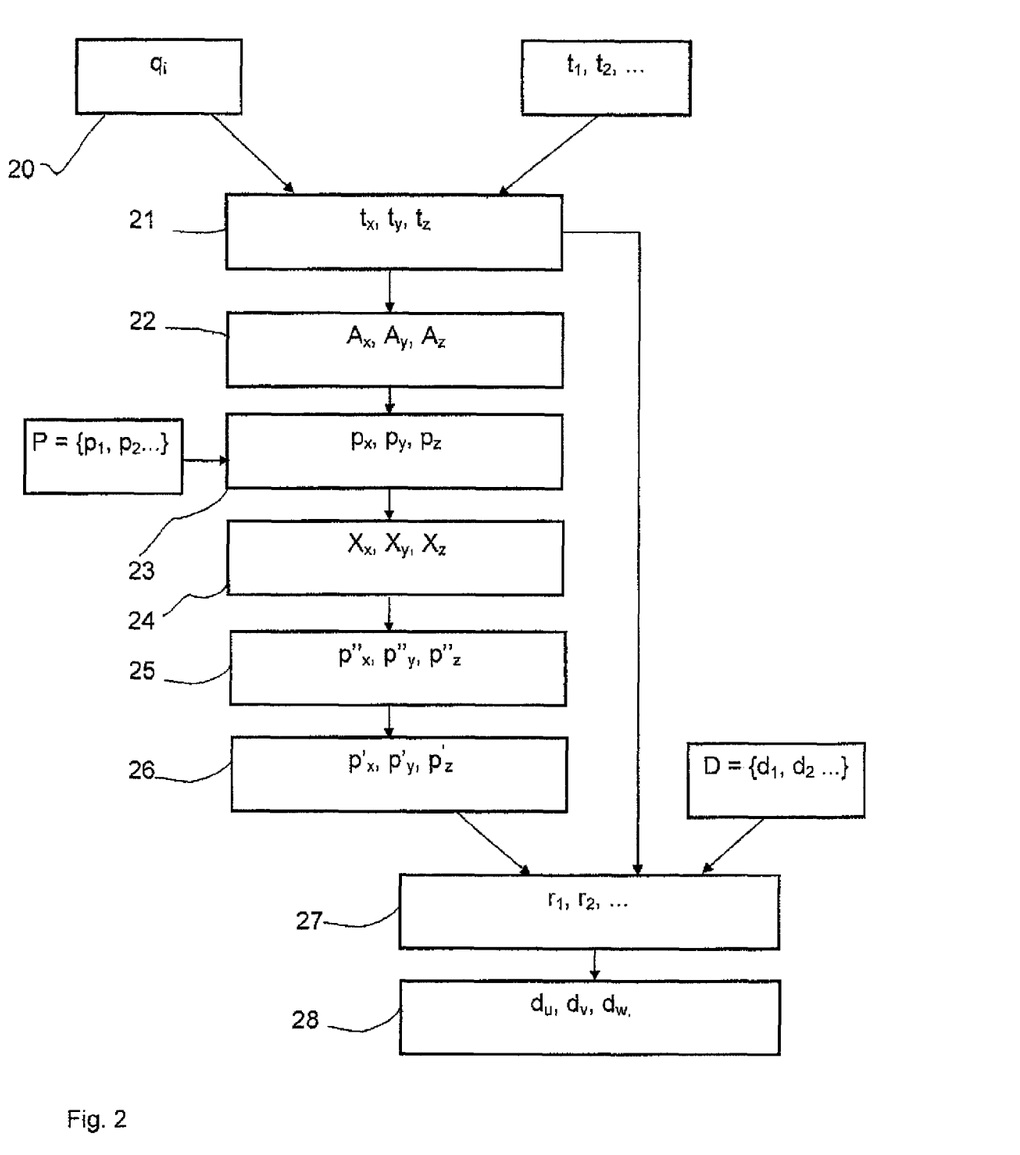
FIG. 2 shows the steps for implementing an exemplary embodiment of the method according to the invention.

The method according to the invention will now be explained in detail below with reference to FIG. 2, said method modifying a known method which considers the inverse frequency of occurrence of terms:

In step 20, a user generates a search query Q which contains the search terms $q_i$, where i is a natural number. As in the example described above, the search term $q_1$ may be "Shirt" and the search term $q_2$ may be "blaues".

In step 21, a subset V containing terms $t_j$ which are similar or identical to the first search term $q_1$ is then ascertained from the reference set T. As explained above, the reference set T may be a word database which contains all the words in a language. Methods for automatically rating the similarity of two character strings are known per se. In this case, the subset V is ascertained by ascertaining the similarity of a search term $q_i$ to all the terms $t_j$ in the reference set T. The terms $t_j$ which are in a particular similarity range are included in the subset V. A method for automatically rating the similarity is described in WO 2007/144199 A1, for example, the disclosure content of which is incorporated herein by way of reference.

The subset V may therefore contain three terms $t_x$, $t_y$ and $t_z$, for example. In the example described above, the following subset V can be ascertained for the search term "Shirt": {Shirt, Shirts, T-Shirt}. The following subset V can be ascertained for the second search term "blaues": {blaues, blau, blaue}.

It is pointed out that the subset V can contain only elements of the reference set T. Therefore, if the search query Q contains an incorrectly spelled word, this word is not included in the subset V, since it is not contained in the reference set T. This allows incorrectly spelled words in a search query Q to be eliminated such that they are not assigned a very high relevance, since they occur very rarely. Nevertheless, incorrectly spelled words are also factored in when rating the relevance of the product database D, since instead of the incorrectly spelled word a subset V which contains terms which are similar to the incorrectly spelled word is factored in. In this respect, the method according to the invention is error-tolerant.

The terms $t_x$, $t_y$ and $t_z$ in the subset V are factored in for the method for rating the relevance of the data records $d_1$ in the product database D, but the relevance of each term $t_j$ in the subset V is determined separately for this rating, which means that not every term $t_j$ in the subset V needs to have the same relevance for rating the product database D. In this regard, for each term $t_j$ in the subset V, a measure of similarity $A_{ik}$ between this term $t_j$ and the underlying search term $q_i$ is determined in step 22. By way of example, it is also possible for this measure of similarity $A_{ij}$ to be determined using a method as described in WO 2007/144199 A1. The subset V can therefore be sorted on the basis of the measure of similarity $A_{ij}$ of the terms $t_j$ contained to a search term $q_i$. If the search term $q_i$ itself is contained in the subset V, this term $t_j$ in the subset V will have the highest measure of similarity $A_{ij}$, since it is identical to the search term $q_i$. As the measure of similarity $A_{ij}$ decreases, the further terms $t_j$ in a subset V follow.

For the search term "blaues", the following sorted subset V may therefore be obtained, for example: 1. blaues, 2. blaue, 3. blau.

In step 23, the probabilities $p_j$ of the terms $t_j$ in the subset V are then determined. This is the probability $p_j$ of the term $t_j$ being pulled from the database D if one is selected at random. By contrast, in the case of the measure of relevance described above (inverse document frequency), the frequency of the documents, i.e. data records, has been considered. As explained above, this involves the probability $p_j$, stored in advance, of the term $t_j$ in the subset T occurring, i.e. in particular texts or in the data records $d_1$, being read from the memory 11. In the case of the method described specifically here, it may be, by way of example, that the word "blaues" occurs with a probability of 0.02, the word "blaue" occurs with a probability of 0.01 and the word "blau" occurs likewise with a probability of 0.01. Furthermore, it is possible to additionally determine the probability of one of the words "blaues", "blaue", "blau" occurring. This probability is 0.04.

In step 24, a weighting distribution $X_j$ is then applied for each term $t_j$ in the subset V. In this case, the type of weighting distribution $X_j$ is dependent on that term $t_j$ in the subset V which is being considered. In the simplest case, the weight distribution $X_j$ is a step function which outputs the weighting 1 for the term $t_j$ which is being considered, and also for such other terms $t_k$ in the subset V as have a higher measure of similarity $A_{ik}$ than the term $t_j$ which is currently being considered. In this case, the weighting distribution $X_j$ therefore acts as a filter which filters out all the terms $t_k$ in the subset V which have a lower measure of similarity A than the term $t_j$ under consideration.

From the weighted probabilities, a modified term probability $p''_j$ is then determined in step 25, i.e. the modified probability $p'_j$ is determined for the term $t_j$.

When the word "blaues" is considered in the specific example, the result is that this word has the highest measure of similarity A, since it is identical to the search term "blaues". The modified term probability $p''_x$ of the word "blaues" therefore corresponds to the probability $p_x$ of the word "blaues".

On the other hand, when the word "blaue" is considered, the result is that the word "blaues" has a higher measure of similarity A, whereas the word "blau" has a lower measure of similarity A. The determination of the modified term probability $p''_y$ for the word "blaue" therefore factors in the probability $p_y$—weighted with 1—for the word "blaue" and also the probability $p_x$—weighted with 1—for the word "blaues" when determining the modified term probability $p''_y$ for the word "blaue".

Finally, when the modified term probability $p''_z$ for the word "blau" is determined, the result is that the words "blaues" and "blaue" have a higher measure of similarity A than the word "blau", which means that the determination of the modified term probability $p''_z$ for the word "blau" factors in all the probabilities of the words "blau", "blaue" and "blaues", each weighted with 1.

Hence, the modified term probability $p''_x$ obtained for the word "blaues" is 0.02 (probability for the word "blaues"), the modified probability $p''_y$ obtained for the word "blaue" is 0.03 (probability for the word "blaue" or "blaues") and the modified probability $p''_z$ obtained for the word "blau" is 0.04 (probability for the word "blau", "blaue" or "blaues").

Step 26: in order to rate data records, it makes sense to calculate the probability of a data record containing a term, and to this end it makes sense to factor in the number of terms per data record. This has a distribution which can be ascertained and stored in advance. By way of example, the average number of terms per data record can be ascertained. Alternatively, a precise calculation is possible. For the example with 300 data records, 150 of these are considered to have 5 terms and a further 150 are considered to have 10 terms. The probability of a combination of 5 terms containing a given term, for example 'blaues', can be calculated by means of the following: $1-(1-p'_x)^5$. The expression in brackets indicates the probability of a term distinctly not being 'blaues'. The power of 5 then gives the probability of a combination of 5 terms not containing the term 'blaues'. The whole expression then gives the relevant probability of a data record of length 5 containing the term. For data records of length 10, the expression is obtained as follows: $1-(1-p'_x)^{10}$. In the example, however, 150 data records each have the length 5 and 150 data records each have the length 10. This then produces an overall probability of any data record containing the term 'blaues' as follows:

$$p'_x = \frac{150(1-(1-p''_x)^5)+150(1-(1-p''_x)^{10})}{300}$$

This gives the modified probability of a data record containing the term 'blaues' as follows: 0.14. On the basis of the same method, the modified probabilities become: $p''_y(=0.20)$ $$p'_y = \frac{150(1 - (1 - p''_y)^5) + 150(1 - (1 - p''_y)^{10})}{300}$$

and $p''_z$ (=0.26 are calculated.

Next, the relevance $r_1$ of the data records $d_1$ to the search query Q is rated in step 27. This involves a check being performed for each term $t_j$ in the subset V to determine whether it occurs in a data record $d_1$. If a term $t_j$ in the subset V does occur in a data record $d_1$, this data record $d_1$ is provided with higher relevance $r_1$ than a data record $d_m$ in which the term $t_j$ in the subset V does not occur. Furthermore, a data record $d_1$ in which a term $t_j$ which has a lower modified probability $p'_j$ occurs is provided with a higher relevance rating $r_1$ than a data record $d_m$ in which a term $t_j$ which has a higher modified probability $p'_j$ occurs. Furthermore, the relevance rating $r_1$ of a data record $d_1$ becomes higher when a term $t_j$ in the subset V occurs in this data record $d_1$ more frequently. Finally, the individual fields of the data records $d_1$ can also be weighted differently. When a term $t_j$ occurs in a field of a data record $d_1$, this can result in a higher relevance rating $r_1$ for the data record $d_1$ than if the same term $t_j$ occurs in another, less important field of the data record $d_1$.

The relevance rating $r_1$ described above is performed for all search terms $q_i$ when the search query Q contains a plurality of search terms $q_i$. In the specific example, a subset V containing terms $t_j$ for the word "Shirt" is therefore also ascertained. As explained above, this subset V may contain the words "Shirt", "Shirts", "T-Shirt", for example. Accordingly, as described above, the modified probability $p'_j$ for each term $t_j$ in this subset V is determined for the search term "Shirt". In this case, for example, the modified probability obtained for the word "Shirt" is 0.05 (probability for the word "Shirt"), the modified probability obtained for the word "Shirts" in this subset V is 0.07 (probability for the word "Shirt" or "Shirts") and the modified probability obtained for the word "T-Shirt" in this subset V is 0.14 (probability for the word "Shirt", "T-Shirt" or "Shirts").

It is then possible to perform a relevance rating for the original search query "blaues Shirt". The probability of a data record $d_1$ containing the term "blaues Shirt" is 0.007, and this results in a relevance rating of 2.14. If a data record $d_1$ contains the term "blaue Shirts", a modified probability of 0.015 is obtained. (This is the product of the modified probabilities for "blaue" (0.20) and "Shirts" 0.07).) This results in a relevance rating of 1.84 (the absolute value of the logarithm of 0.015) for this data record $d_1$. If a data record $d_1$ contains the term "T-Shirt blau", a modified probability of 0.036 is obtained. This results in a relevance rating of 1.4 for the data record $d_1$.

Finally, in the case of a plurality of search terms $q_i$, it is also possible to factor in the order and the positions of the occurrence of the terms $t_j$ in the respective subset V in a data record $d_1$. If the search query Q contains the search terms $q_1$, $q_2$ in this order, a data record $d_1$ which terms $t_j$ in the subset V which belong to the first search term $q_1$ first and then terms $t_k$ in the other subset V which belong to the second search term $q_2$ second, this results in a higher relevance rating than if the terms occur in the converse order. Furthermore, a data record $d_1$ is rated with a higher relevance when the terms $t_j$ in the two subsets occur close together. A particularly high relevance rating is obtained when the terms $t_j$ in the two subsets for the two search terms $q_1$ and $q_2$ occur in succession, particularly in the correct order. The further apart from one another the terms $t_j$ in the two subsets for the two search terms occur in a data record $d_1$, the greater the probability of them occurring in different linguistic contexts, for example in the product description, which means that the occurrence of the terms $t_j$ then results in a lower relevance rating. In this case too, it is possible to apply the same principle, described above, of ascertaining the probability for a data record which contains the search terms or terms $t_j$ in the subset V in the same or a better position. In this case, it is assumed that the positions of the terms $t_j$ in the data records $d_1$ are independent random variables.

After a relevance rating $r_1$ has been performed for each data record $d_1$, a list containing the data records $d_u$, $d_v$, $d_w$, ... which have the highest relevance rating $r_i$ is produced in step 28. This list is then output in the order of the relevance ratings $r_1$.

A second exemplary embodiment of the method according to the invention is described below:

The second exemplary embodiment differs from the first exemplary embodiment described above in the weighting distribution X. In the second exemplary embodiment, the probability distribution X is a sigmoid function. In the sigmoid function, a continuous transition is obtained between the two values 0 and 1. The effect achieved by this is that terms $t_k$ in the subset V which have a smaller measure of similarity A, but the measures of similarity of which are very close to the term $t_j$ for which the modified probability $p'_j$ is ascertained, are not—as in the first exemplary embodiment—ignored, but rather are also factored in with a lower weighting.

However, terms $t_k$, which have a very much lower measure of similarity A than the term $t_i$ under consideration, continue to be ignored in practice, since the weighting ascertained from the sigmoid function is close to 0.

In the case of the second exemplary embodiment, the weighting with which the probability $p_j$ of a second term $t_k$ goes into the modified term probability $p''_j$ of a first term $t_j$ is determined by evaluating a sigmoid function, the evaluation center being the subtraction of the measure of similarity $A_{ij}$ of the first term $t_j$ from the measure of similarity $A_{ik}$ of the second term $t_k$. This is explained below using the example of the search term (qi) "Sympathie". In this regard, the device 5 (step 21) has ascertained a set of similar terms (V), and the devices 6 and 7 (steps 22, 23) have ascertained the associated similarities and term probabilities.

| Term | Similarity to the search term | Term probability |
| --- | --- | --- |
| Sympathie ($t_1$) | 100 ($A_{i1}$) | 0.003 ($p_1$) |
| Symphatie ($t_2$) | 83.4 ($A_{i2}$) | 0.0005 ($p_2$) |
| Synpathie ($t_3$) | 83.4 ($A_{i3}$) | 0.0005 ($p_3$) |
| Sympathisch ($t_4$) | 80.9 ($A_{i4}$) | 0.002 ($p_4$) |
| Sympathy ($t_5$) | 79.7 ($A_{i5}$) | 0.002 ($p_5$) |

The device 8 (step 24) then ascertains the weighting distribution using a sigmoid function. One possible such function is the cumulative Gaussian normal distribution. The similarity differences (with the associated weighting), as calculated by the device 8, are shown below:

|  | ($t_1$) | ($t_2$) | ($t_3$) | ($t_4$) | ($t_5$) |
| --- | --- | --- | --- | --- | --- |
| $A_{ik} - A_{i1}$ ($X_1$) | 0 (0.5) | −16.6 (0.0) | −16.6 (0.0) | −19.1 (0.0) | −20.3 (0.0) |
| $A_{ik} - A_{i2}$ ($X_2$) | 16.6 (1.0) | 0 (0.5) | 0 (0.5) | −2.5 (0.01) | −3.65 (0.0) |
| $A_{ik} - A_{i3}$ ($X_3$) | 16.6 (1.0) | 0 (0.5) | 0 (0.5) | −2.5 (0.01) | −3.65 (0.0) |

-continued

|  | $(t_1)$ | $(t_2)$ | $(t_3)$ | $(t_4)$ | $(t_5)$ |
|---|---|---|---|---|---|
| $A_{ik} - A_{i4}$ $(X_4)$ | 19.1 (1.0) | 2.5 (0.99) | 2.5 (0.99) | 0 (0.5) | −1.2 (0.12) |
| $A_{ik} - A_{i5}$ $(X_5)$ | 20.3 (1.0) | 3.65 (1.0) | 3.65 (1.0) | 1.2 (0.88) | 0 (0.5) |

The modified term probabilities are then obtained by applying the weighting to the original term probabilities:

|  | $(p_1 = 0.003)$ | $(p_2 = 0.0005)$ | $(p_3 = 0.0005)$ | $(p_4 = 0.002)$ | $(p_5 = 0.002)$ |
|---|---|---|---|---|---|
| $p_1'' =$ | 0.5 * 0.003 | +0.0 | +0.0 | +0.0 | +0.0 |
| $p_2'' =$ | 1.0 * 0.003 | +0.5 * 0.0005 | +0.5 * 0.0005 | +0.01 * 0.002 | +0.0 |
| $p_3'' =$ | 1.0 * 0.003 | +0.5 * 0.0005 | +0.5 * 0.0005 | +0.01 * 0.002 | +0.0 |
| $p_4'' =$ | 1.0 * 0.003 | +0.99 * 0.0005 | +0.99 * 0.0005 | +0.5 * 0.002 | +0.12 * 0.002 |
| $p_5'' =$ | 1.0 * 0.003 | +1.0 * 0.0005 | +1.0 * 0.0005 | +0.88 * 0.002 | +0.5 * 0.002 |

This results in the property according to the invention that terms which have a greater measure of similarity go into the modified term probability more strongly than terms which have a smaller modified term probability.

Assuming that the database has the same distribution of terms per data record as in the previous exemplary embodiment, i.e. 150 data records have 5 terms and 150 data records have 10 terms, the respective modified probabilities $p_1'$, $p_2'$, $p_3'$, $p_4'$, $p_5'$ can be calculated (Step 26) by means of the formula already ascertained.

$$p_i' = \frac{150(1 - (1 - p_i'')^5) + 150(1 - (1 - p_i'')^{10})}{300}$$

These modified probabilities are then transmitted to the rating unit 9 as in the previous exemplary embodiment according to the invention.

The method steps described above can be implemented as hardware components or as software. The software may be stored on a data storage medium, i.e. on a computer program product. The program code which the software contains is suitable for carrying out the method described above when the program code is executed by a computer.

Having described the invention, the following is claimed:

1. A computer-implemented method for searching a multiplicity (D) of data records ($d_1$), in which
   a search query (Q) containing at least one search term ($q_i$) is received,
   a subset (V) containing terms ($t_j$) which are similar or identical to the search term ($q_i$) is ascertained from a reference set (T),
   for each term ($t_j$) in the subset (V)
     a measure of similarity ($A_j$) to the search term ($q_i$) is determined, the probability ($p_j$) of the occurrence of the term ($t_j$) is determined, a weighting distribution ($X_j$) which is dependent on the term ($t_j$) is applied to the terms ($t_k$) in the subset (V), wherein the terms ($t_k$) which have a higher measure of similarity ($A_k$) are weighted more strongly than terms ($t_k$) having a lower measure of similarity ($A_k$), and
     a modified probability ($p'_j$, $p''_j$) for the term ($t_j$) is determined from the weighted probabilities of the terms ($t_k$) in the subset (V),
   the data records ($d_1$) are rated for relevance (R) of the data records ($d_1$) to the search query (Q), wherein
   a check is performed to determine whether the terms ($t_j$) in the subset (V) occur in the data record ($d_1$), and
   if a term ($t_j$) in the subset (V) does occur in the data record ($d_1$) then a lower modified probability (p'j, p''j) for the term ($t_j$) results in a higher relevance rating for the data record ($d_1$), and
   at least one data record subset is output on the basis of the relevance rating (R) associated therewith.

2. The method as claimed in claim 1, wherein
   the weighting distribution ($X_j$) is in a form such that the determination of the modified probability ($p'_j$, $p''_j$) of a term ($t_j$) factors in only the probability ($p_j$) of the term ($t_j$) itself and also the probability ($p_k$) of other terms ($t_k$) which have a higher measure of similarity ($A_k$) than the one term ($t_j$).

3. The method as claimed in claim 1, wherein
   the weighting ($X_j$) with which the probability ($p_k$) of a second term ($t_k$) goes into the modified probability ($p'_i$, $p''_i$) of a first term ($t_i$) is determined by the evaluation of a sigmoid function, the evaluation center being the subtraction of the measure of similarity ($A_k$) of the first term ($t_j$) from the measure of similarity ($A_j$) of the second term ($t_i$).

4. The method as claimed in claim 1, wherein
   the weighting distribution ($X_j$) is in a form such that the determination of the modified probability ($p'_j$, $p''_j$) of a term ($t_j$) also factors in probabilities ($p_k$) of other terms ($t_k$) with a lower weighting which have a lower measure of similarity ($A_k$), the weighting of another term ($t_k$) with a lower measure of similarity being dependent on the difference between the measure of similarity ($A_j$) of the term ($t_j$) for which the modified probability ($p'_j$, $p''_j$) is determined and the measure of similarity ($A_k$) of the other term ($t_k$).

5. The method as claimed in claim 1, wherein
   the determination of the modified probability ($p'_j$, $p''_j$) involves the insertion of an intermediate step in which the distribution of the number of terms per data record is factored in.

6. The method as claimed in claim 1, wherein
   the rating of a data record ($d_1$) is obtained from the absolute value of the logarithm of the modified probability ($p'_j$, $p''_j$) of the associated term ($t_j$).

7. The method as claimed in claim 1, wherein
   the probability ($p_j$) of a term ($t_j$) in the subset (V) is determined by virtue of the probability ($p_j$) associated with the term ($t_j$) being ascertained in advance from the frequency of the occurrence of the term ($t_j$) in the reference set (T) or in the data records ($d_1$) and being stored in a memory, and the stored probability ($p_j$) for the term ($t_j$) being read from the memory.

8. The method as claimed in claim 1, wherein the relevance rating for the data records ($d_1$) involves a data record being rated more highly when a term ($t_j$) in the subset (V) occurs more frequently in this data record.

9. The method as claimed in claim 1, wherein the data records ($d_1$) each contain a plurality of fields and in that the relevance ($r_1$) of a data record ($d_1$) is furthermore rated on the basis of the field in which a term ($t_j$) in the subset (V) occurs in the data record ($d_1$).

10. The method as claimed in claim 1, wherein the search query (Q) contains a plurality of search terms ($q_i$), in that a partial rating is deter mined separately for each search term ($q_i$), in that a further partial rating is determined for the search query (Q) compiled from the search terms ($q_i$) and in that the rating (R) of the search query (Q) is determined from the partial ratings.

11. A computer program product for searching a multiplicity (D) of data records ($d_1$), the computer program product comprising:
   a storage medium storing program code for execution by a computer for performing a method comprising:
      receiving a search query (Q) containing at least one search term ($q_i$),
      a subset (V) containing terms ($t_j$) which are similar or identical to the search term ($q_i$) is ascertained from a reference set (T),
      for each term ($t_j$) in the subset (V)
         a measure of similarity ($A_j$) to the search term ($q_i$) is determined,
         the probability ($p_j$) of the occurrence of the term ($t_j$) is determined,
         a weighting distribution ($X_j$) which is dependent on the term ($t_i$) is applied to the terms ($t_k$) in the subset (V), wherein the terms ($t_k$) which have a higher measure of similarity ($A_k$) are weighted more strongly than terms ($t_k$) having a lower measure of similarity ($A_k$), and
         a modified probability ($p'_j$, $p''_j$) for the term ($t_j$) is determined from the weighted probabilities of the terms ($t_k$) in the subset (V),
      the data records ($d_1$) are rated for relevance (R) of the data records ($d_1$) to the search query (Q), wherein
         a check is performed to determine whether the terms ($t_j$) in the subset (V) occur in the data record ($d_1$), and
         if a term ($t_j$) in the subset (V) does occur in the data record ($d_1$) then a lower modified probability ($p'j$, $p''j$) for the term ($t_j$) results in a higher relevance rating for the data record ($d_1$), and
      at least one data record subset is output on the basis of the relevance rating (R) associated therewith.

12. A search engine executed by a computer, said search engine comprising:
   a reception unit for receiving a search query (Q) containing at least one search term ($q_i$),
   means for ascertaining a subset (V) containing terms ($t_j$) which are similar or identical to the search term ($q_i$),
   means for determining the modified probability ($p'_j$, $p''_j$) for each term ($t_j$) in the subset (V), which are able to be used
      to determine a measure of similarity ($A_j$) to the search term ($q_i$),
      to determine the probability ($p_j$) of the occurrence of the term ($t_j$),
      to apply a weighting distribution (X) which is dependent on the term ($t_i$) to the terms ($t_k$) in the subset (V), wherein the terms ($t_k$) which have a higher measure of similarity ($A_k$) are weighted more strongly than terms ($t_k$) having a lower measure of similarity ($A_k$), and
      to determine the modified probability ($p'_j$, $p''_j$) for the term ($t_j$) from the weighted probabilities of the terms ($t_k$) in the subset (V),
   a rating unit for rating data records ($d_1$) for relevance of the data records ($d_1$) to the search query (Q), wherein
      it is possible to check whether the terms ($t_j$) in the subset (V) occur in the data record ($d_1$), and
      if a teen ($t_j$) in the subset (V) does occur in the data record ($d_1$) then a lower modified probability ($p'_j$, $p''_j$) for the term ($t_j$) results in a higher rating ($r_1$) for the data record ($d_1$), and
   an output unit for outputting at least one data record subset on the basis of the relevance rating (R) associated therewith.

13. The search engine as claimed in claim 12, wherein the search engine comprises a memory which stores the reference set (T) containing terms ($t_j$) or a set containing the terms ($t_j$) which occur in the data records ($d_1$), and also the probabilities ($p_j$) associated with the terms ($t_j$).

* * * * *